(12) United States Patent
Robinson, Jr. et al.

(10) Patent No.: US 10,666,544 B1
(45) Date of Patent: May 26, 2020

(54) METHOD AND APPARATUS FOR PROVIDING SITUATIONAL AWARENESS

(71) Applicant: Lumeta Corporation, Somerset, NJ (US)

(72) Inventors: Bill Calvin Robinson, Jr., Flemington, NJ (US); Mark Thomas Labbancz, Robbinsville, NJ (US); Thomas Allen Price, Cary, NC (US)

(73) Assignee: Lumeta Corporation, Somerset, NJ (US)

( * ) Notice: Subject to any disclaimer, the term of this patent is extended or adjusted under 35 U.S.C. 154(b) by 175 days.

(21) Appl. No.: 14/497,428

(22) Filed: Sep. 26, 2014

(51) Int. Cl.
*H04L 12/751* (2013.01)
*G06F 16/24* (2019.01)

(52) U.S. Cl.
CPC .............. *H04L 45/02* (2013.01); *G06F 16/24* (2019.01)

(58) Field of Classification Search
CPC ................................. H04L 45/02; G06F 16/24
USPC ......................................................... 709/224
See application file for complete search history.

(56) References Cited

U.S. PATENT DOCUMENTS

| | | | | |
|---|---|---|---|---|
| 7,826,482 B1* | 11/2010 | Minei | .................... | H04L 45/24 370/395.5 |
| 2006/0104230 A1* | 5/2006 | Gidwani | ............... | H04W 84/00 370/328 |
| 2006/0182034 A1* | 8/2006 | Klinker | .................... | H04L 43/00 370/238 |
| 2006/0184682 A1* | 8/2006 | Suchowski | ........... | H04L 63/102 709/229 |
| 2008/0162390 A1* | 7/2008 | Kapoor | ................... | G06F 9/505 706/20 |
| 2008/0219268 A1* | 9/2008 | Dennison | ............ | H04L 12/4625 370/395.2 |
| 2008/0307082 A1* | 12/2008 | Cai | .................... | G06F 15/17337 709/223 |
| 2010/0094981 A1* | 4/2010 | Cordray | .................. | H04L 69/40 709/222 |
| 2010/0118714 A1* | 5/2010 | Labovitz | ................. | H04L 41/12 370/252 |

(Continued)

*Primary Examiner* — Umar Cheema
*Assistant Examiner* — Tony Williams
(74) *Attorney, Agent, or Firm* — Morgan, Lewis & Bockius LLP

(57) ABSTRACT

Network route control plane data, advertised by one or more routers on a network, is received from a passive discovery module. The passive discovery module is configured to communicate with the routers using one or more routing protocols, but not to advertise route data. The received network route control plane data is compared to network element data stored in a network element database. If the received network route control plane data is not contained in the network element database, the received network route control plane data is stored in the network element database. If the received network route control plane data is contained in the network element database, the received network route control plane data is compared to target asset data stored in a target asset database. If the received network route control plane data is not contained in the target asset database, the received network route control plane data is stored in the target asset database. The target asset database is analyzed for unscanned targets. Data describing unscanned targets is delivered to an active discovery module.

10 Claims, 4 Drawing Sheets

(56) References Cited

U.S. PATENT DOCUMENTS

| | | | |
|---|---|---|---|
| 2010/0199188 A1* | 8/2010 | Abu-Hakima | H04L 12/1895 715/733 |
| 2012/0224474 A1* | 9/2012 | Beser | H04W 40/12 370/228 |
| 2013/0268652 A1* | 10/2013 | Hugard, IV | H04W 4/38 709/224 |
| 2014/0003232 A1* | 1/2014 | Guichard | H04L 67/16 370/230 |
| 2014/0201838 A1* | 7/2014 | Varsanyi | G06F 21/552 726/23 |

* cited by examiner

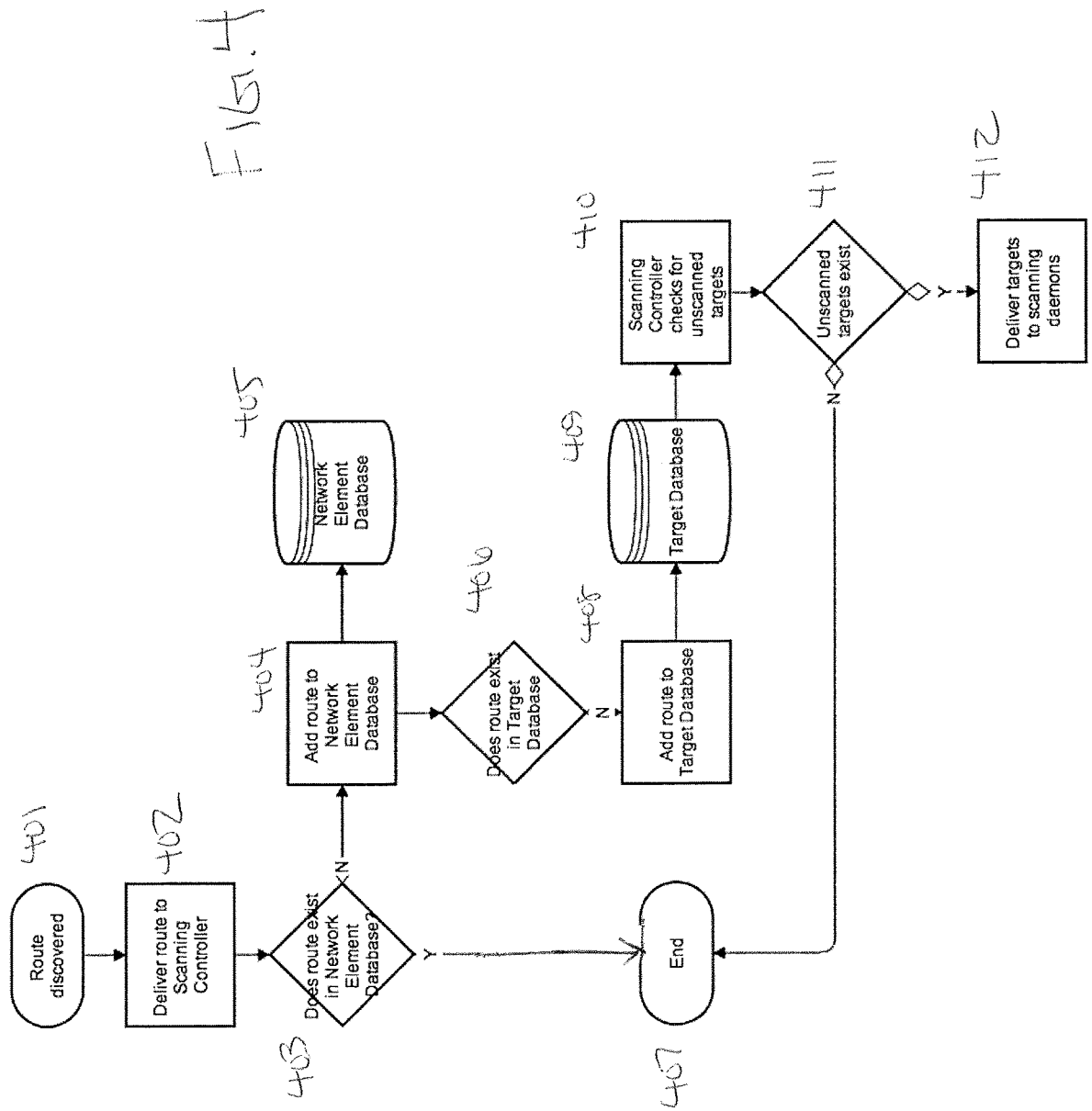

METHOD AND APPARATUS FOR PROVIDING SITUATIONAL AWARENESS

FIELD OF THE INVENTION

The invention relates to providing network situational awareness using an interactive combination of passive and active crawling techniques.

BRIEF SUMMARY OF THE INVENTION

In accordance with embodiments of the present invention, there is provided a computerized method, system and computer readable medium storing instructions which, when executed by a computer processor, cause the computer processor to perform a method as described herein. Network route control plane data, advertised by one or more routers on a network, is received from a passive discovery module. The passive discovery module is configured to communicate with the one or more routers using one or more routing protocols, but not to advertise route data. The received network route control plane data is compared to network element data stored in a network element database. If the received network route control plane data is not contained in the network element database, the received network route control plane data is stored in the network element database. If the received network route control plane data is contained in the network element data database, the received network route control plane data is compared to target asset data stored in a target asset database. If the received network route control plane data is not contained in the target asset database, the received network route control plane data is stored in the target asset database. The target asset database is analyzed for unscanned targets. Data describing unscanned targets is delivered to an active discovery module.

In some embodiments, data describing one or more of devices, paths, hosts, and ports associated with the network are received from the active discovery module.

In further embodiments, the passive discovery module is implemented as at least part of a collector module, the collector module further being configured to conduct active discovery. In still further embodiments, the active discovery module is implemented as at least part of a collector module, the collector module further being configured to conduct passive discovery.

In other embodiments, the data describing the devices, paths, hosts, and ports is stored for forensics and cyber-security analytics.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 4 is flow chart illustrating an exemplary method of the crawling techniques of the present invention.

DETAILED DESCRIPTION OF THE PREFERRED EMBODIMENTS

Figure 1:
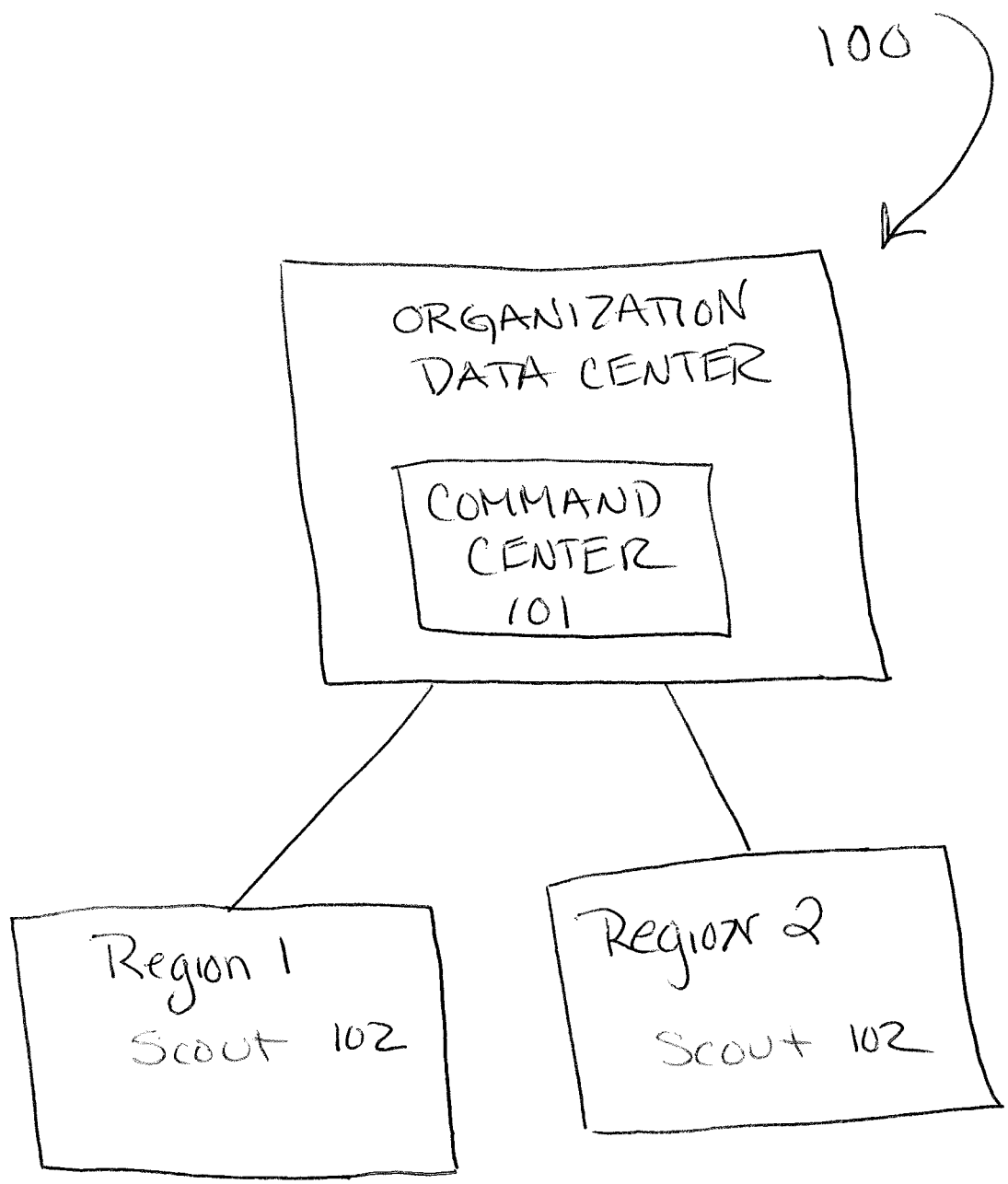
FIG. 1 is a diagram illustrating an exemplary computer architecture in accordance with an embodiment of the present invention.

Modern networks involve dynamic, often software-driven, changes in network characteristics, including mobile, virtualized and cloud infrastructures, and software-defined networks and data centers. Prior art network discovery tools involve point-in-time and on-demand scan technologies. Such tools are unable to identify network changes, or associated security anomalies, that are time-bound and occurring outside of the scan window. Thus, they are not well-suited to perform network discovery for modern networks.

Embodiments of the inventive systems and methods described herein provide a real-time network situational awareness software solution. In contrast to existing point-in-time discovery tools, in order to achieve real-time, continuous network situational awareness, in accordance with the present invention, crawlers are always running and collecting information from the network. Also, as described further herein, the passive crawlers are implemented within the network's control plane activity such that network changes are detected immediately as they occur and are detectable (e.g., within seconds or minutes). Thus, active crawlers can interrogate and evaluate those network changes and associated cyber-security impacts while they are relevant and as they occur, resulting in fewer or no missed events and any associated cyber-security impacts.

More particularly, embodiments of the invention run in an always-on mode and provide network discovery, leak path detection, visualization, and analytics. Embodiments of the invention are particularly suited to provide network situational awareness beyond traditional physical networks to include awareness of an organization's presence in private, public, and hybrid cloud networks. Further, embodiments of the invention can be useful in performing network discovery for organizations that have bring-your-own-device policies, which allow employees to connect to enterprise networks with personal mobile devices. Constant change of the network topology is typical in these environments, and managing network security and risks is extremely challenging as a result. In many industries, continuous network vulnerability assessment in real-time is a critical element of protecting national security interests, commercial trade secrets and intellectual property, and maintaining compliance with various regulations and directives.

Embodiments of the invention involve crawling an organization's network, as described in more detail herein. Data collected from the crawling activity may be used to create comprehensive, detailed network topology maps in real-time. The security posture of the network is ascertained and mapped as it is occurring. Further, policy-driven alerts and notifications may be issued as the enterprise network changes and evolves.

Organizations can define network zones and establish baseline rules for those zones. By way of example, a large global organization may define zones based on geography, network type (e.g. public or private cloud) or environment (e.g. development, testing, production, critical assets) and define a set of policies for each zone. Using the systems and methods described herein, changes to the network topology can be automatically detected, and real-time alerts of possible security policy violations and network vulnerabilities can be provided. Network changes can be documented for regulatory compliance. Events or configurations linked to adversarial or anomalous conditions at the enterprise level can be identified. Trend reporting and policy management may be provided based on a number of different variables including, by way of example:

Routers with unknown Classless Inter-Domain Routing (CIDR) addresses: Routers exhibiting addresses in their internal route tables which are ostensibly not known/allowed by the target address list known to the organization.

Unknown Devices: Devices or hosts responding to interrogation which are ostensibly not known to the organization based on the target address list.

Not-responding networks: Networks that are in the known target list which are not providing responses expected from an active network.

Infection Signature Ports: Commonly used exploit ports which should be non-responsive but are actually responding.

Vulnerable Ports: Ports which should be non-responsive but are actually responding.

Expired SSL Certificates: X.509 Security Certificates that are no longer valid.

Self Signed Certificates: X.509 Security Certificates that are self-signed and not originating from a root certificate authority.

Unauthorized Forwarding Devices: Networking devices that allow traffic forwarding but should not be (e.g., to public Internet or third party partner network).

Routers Responding to Default Simple Network Management Protocol (SNMP) strings: Serious network infrastructure vulnerability responding to default/public SNMP queries.

Inbound/Outbound Leak Paths: Undesirable paths allowing possible connectivity from the outside (inbound) or from the inside (outbound).

Leaking Routers: Routers involved with leak paths.

As will be understood by those skilled in the art, other and different variables may be considered in connection with network discovery and reporting within the scope of the present invention.

Referring to FIG. 1, in an exemplary embodiment, a computer system 100 may be employed within an organization seeking to perform network discovery. Computer system 100 may be implemented as a two-tiered architecture and include command center 101 in a first layer and one or more scouts 102 in a second layer. While other architectures are possible within the scope of the present invention, the two-tier architecture depicted facilitates deployment of the present invention within an organization on a software-as-a-service (SaaS) basis. In the exemplary embodiment, the command center 101 is a web-based interface, comprising hardware (e.g., computer processors and memory) and software (e.g., stored in the memory and executed by the processors), that provides visualization, policy configuration and reporting functions. Command center 101 also distributes configuration information to distributed scouts 102. Scouts 102 comprise hardware and/or software modules that engage in active crawling (e.g., scanning and interrogating devices) and passive crawling (listening for devices), as described in more detail herein.

Scouts 102 are distributed across the network to allow for cross-domain discovery and can be assigned to engage in crawling within multiple zones or regions within an organization.

Figure 2:
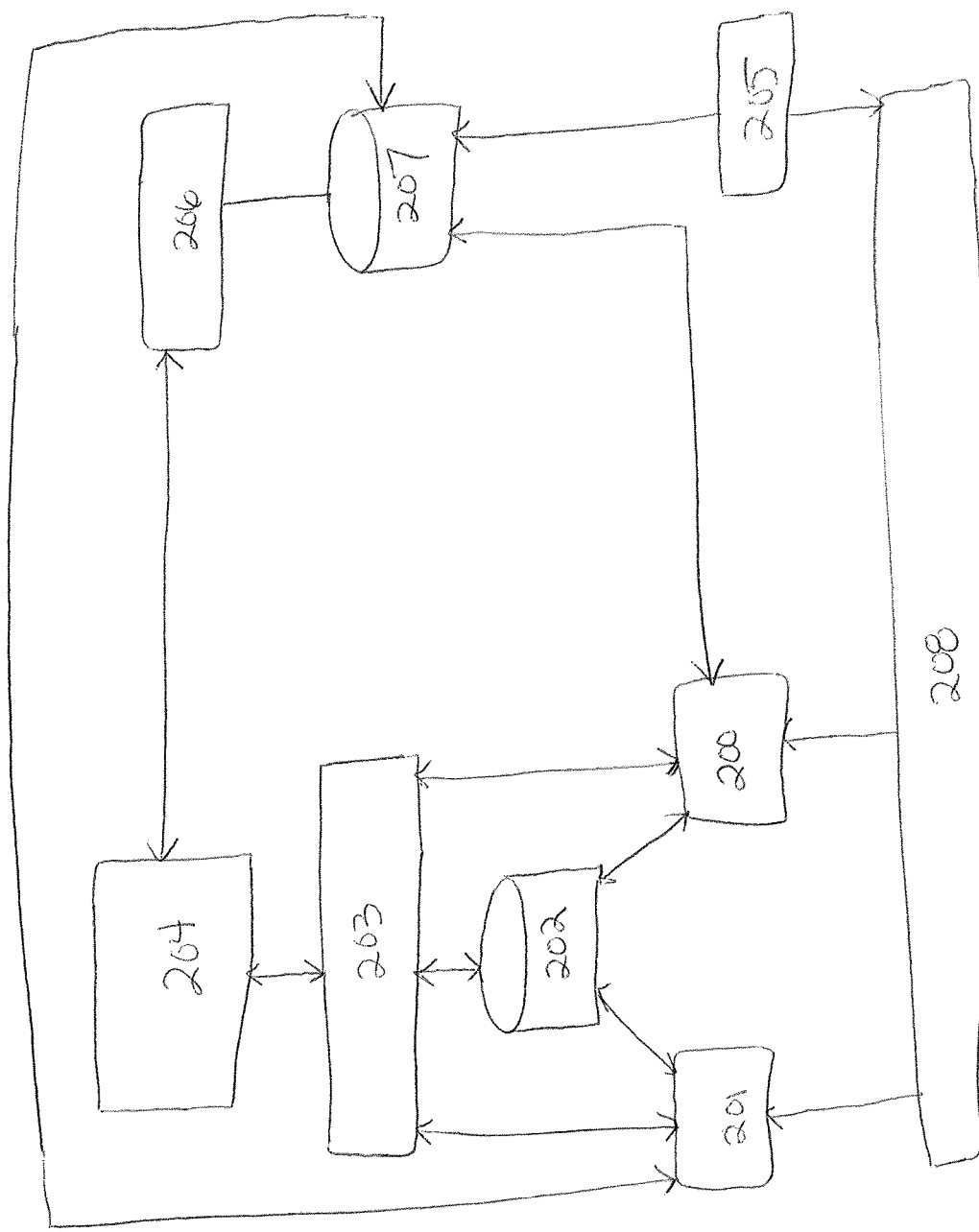
FIG. 2 is a diagram illustrating exemplary software components that may be used to implement an embodiment of the present invention.

With reference to FIG. 2, in an exemplary embodiment, the computer system 100 includes the following software components (e.g., computer readable instructions stored in a non-transitory medium and executed by one or more processors) written on top of an operating system (e.g., CentOS, a Linux operating system). Discovery engine is responsible for implementing active network crawling techniques and passive crawling techniques. Discovery engine, in an exemplary embodiment, may be written largely in Java with some limited C and Perl-scripting and include active crawling programming components 200 and passive crawling programming components 201. Active network crawling techniques may include Internet Control Message Protocol (ICMP) path discovery, host probing using other protocols and port combinations, SNMP discovery of layer 3 route and layer 2 MAC information, Transmission Control Protocol (TCP) SYN port discovery, packet source/destination spoofing for leak discovery, HTTP banner analysis, and HTTPS certificate analysis, by way of example. Passive network crawling techniques may include broadcast listening algorithms and analytics (Address Resolution Protocol (ARP), Dynamic Host Configuration Protocol (DHCP), IPv6 Neighbor discovery protocol) and routing protocols (Open Shortest Path First (OSPF), Border Gateway Protocol (BGP), Intermediate System to Intermediate System (IS-IS)) to discover real-time changes to the state of the network infrastructure. Discovery engine may also be responsible for executing various data analytics programs 206 (e.g., implemented in SQL and Java) that analyze and link the myriad of discovered raw material into actionable data, prioritized anomalies and visualized reports (e.g., using the exemplary variables listed above). Active crawling programming components 200 and passive crawling programming components 201 communicate with (e.g., interrogate and listen) the network under examination through network interface(s) 208.

A database 202 (e.g., a structured query language (SQL) database) may be employed for storage of raw data and analytical data generated using the aforementioned algorithms.

An application programming interface (API) 203 (e.g., implemented as a RESTful interface in Java) provides access to analyzed data, queuing and messaging functions, setup and configuration. API 203 may also support the implementation of integrations with third party security system products and services (not shown). Such third party products and offerings may include, e.g., "best of breed" cyber-security or network management tools used inside the network, including those that perforin device vulnerability management, security information and event management, web application vulnerability assessment, and IP address management. API 203 could also integrate with virtualization stack or software-defined networking products.

A web application user interface (UI) 204 (e.g., implemented in HTML5, CSS, Java and other widely used web technologies) provides a graphical interface for visualization, reporting and administration functions.

As will be understood by those skilled in the art, the described components of system 100 are exemplary only. Different or additional components may be used within the scope of the present invention.

The data collected by system 100 may be combined with network metadata provided by external sources 205 and saved in database 207 (e.g., NoSQL database). Examples of these external sources may include network flow information, cloud or virtual stack information provided via third party APIs, and information from network-hypervisors in a software defined network or software defined data-center infrastructure. The combination of these sources with the data collected by system 100 allows for the creation of network visualizations (e.g., pre-defined or end user-defined) using data analytics program 206.

In order to perform network discovery for a given organization, an administrator, employing web application UI 204, or a command line interface, may define the network zones and policies per zone depending on the needs of the organization. Within network zones, collection software routines (referred to herein as collectors) are developed and defined to crawl the network based upon the needs and risk concerns of each specific zone. Collectors define the types of discovery to be performed as well as the details (e.g., the ports used, SNMP credentials etc.). A collector may have just one crawling function (e.g., OSPF route listening) or many crawling functions (i.e. OSPF listening plus active path discovery plus host port usage analysis) depending on the scope and scale of the network zone in question.

Collectors allow for the interplay between passive and active crawling techniques in accordance with exemplary embodiments of the present invention (i.e., collectors are configured to engage in active and/or passive crawling techniques). Thus, for example, if a new network device is identified via an OSPF new consolidated route message (or equivalent messages for BGP, or IS-IS or ARP, or DHCP, etc.) which is passively identified on the network, a workload request may be queued for that same or another logical collector to kick off an active SNMP, ICMP or port interrogation, while that device is still visible, to ascertain its impact upon the network. Furthermore, collectors may be provisioned to be recursive, i.e., if a new network device, route or path is identified, collection algorithms may in turn be applied to that newly identified infrastructure as soon as it is identified. Thus, discovered networks lead to the discovery of further networks.

In one embodiment, scouts 102 are located strategically in various regions of the network (see FIG. 1) for visibility purposes and may be leveraged by one or more collectors to gather network situational awareness data.

A general overview of the process implemented by an exemplary embodiment of the present invention is now described. Once the zones and associated collectors are defined, the discovery process starts with a target list provided by the organization. The target list can include as few as one network IP address within the organization's network. The list is queried by the collector agents to define a set of targets to which they will then actively send network packets and conduct active discovery, as defined in more detail herein. One item of discovery performed by the active crawlers includes pulling the routing table of any router that is encountered during discovery. Passive discovery is also conducted, as described in more detail herein. The passively discovered routes, as well as the routes pulled from routers encountered during active discovery, represent possible new target networks for discovery. The networks identified by the routes are compared to the target list provided by the organization to determine if they are already included in active targeting. If they are not, then the newly discovered networks are added to the target list. In certain embodiments, organizations may be able to designate certain networks, or portions of networks, as eligible for targeting, or otherwise indicate that such networks, or portions of networks, are to be avoided by the crawlers. In such cases, the crawlers check to see if a network, or portion of a network is flagged as "eligible" or "avoid" before undertaking discovery activity with regard to that network or element. This process is then repeated, with each collector requesting a new set of targets from the expanding target list resulting from the passive and active discovery previously performed. This recursive process of discovered networks being fed back into the target determination algorithm, which includes a determination as to whether newly discovered routes or IP addresses have been designated as "eligible" or "avoid" on a list provided by the organization. This allows for starting with, e.g., a single target IP address and a router, and ultimately discovering an organization's entire network.

A more detailed explanation of active crawlers and passive crawlers, their configuration and functionality, is now provided.

Active crawlers generate target lists of addresses and actively send requests to hosts. Active crawlers continuously re-generate their target lists based on data discovered by other crawlers and formulate and send requests to those new targets.

In accordance with exemplary embodiments of the present invention, active crawlers may be configured in the following exemplary manners. As will be understood by one of ordinary skill in the art, the below-listed configurations are exemplary only. Active crawlers may be configured to discover different types of paths, or scan other types of devices, within the scope of the present invention.

Active crawlers may be configured for discovery of paths. In this case, an active crawler may run multi-protocol traceroutes against target spaces found in the target list provided by the organization that is part of the configuration of the collector or discovered by passive or active discovery techniques. For example, an active crawler may be configured to target all IP routing addresses allocated using CIDR in the target list using CIDR expansion rules. If an active crawler is configured such that traceDiscoveredRoutes is set, the active crawler will target all routes discovered via SNMP or OSPF using CIDR expansion rules. If an active crawler is configured such that traceToHosts is set, the active crawler will target all hosts.

Active crawlers may also be configured to discover hosts. In so doing, the active crawlers generate network packets for multiple protocols for target spaces in the configuration. The active crawlers may also scan any host IP addresses found in other scan types (e.g., ARP, ICMP v6, DHCP, OSPF v2, OSPF v3, SNM, ICMP, UDP, High Port, TCP, HTTP and HTTPS CIFS, leak path discovery, BGP, IS-IS, EIGRP, and Netflow). Crawlers may be configured to test all discovered hosts for SNMP responsiveness using configured SNMP credentials. Thus, for example, an active crawler may be configured to target all IP routing addresses allocated using CIDR in the target list. Further, for example, if targetInternalRoutes is enabled, an active crawler targets all routes in the private address space (e.g., address space which is not routable on the public internet).

Still further, an active crawler may be configured to test all discovered hosts for open/closed TCP ports. In connection with TCP port discovery, the active crawler targets all hosts using the port list from profiling.httpPorts and profiling.httpsPorts when profiling.collectHTTP is enabled; using the port list from tcpPorts when tcpDiscovery.enabled is set; and using the default OSD port list when profiling.scanStandardTCPPorts or collectEnhancedTCP is enabled.

Active crawlers may be configured to discover details about devices on the network. For example, such crawlers may be configured to scan SNMP responsive devices for layer 2/3 (i.e., data link/network layer) information about interfaces and connected hosts. Such crawlers may also be configured to scan TCP responsive devices for HTTP response data and SSL certificate information. In connection with SNMP discovery, an active crawler targets all hosts using all credentials. For example, an active crawler targets all SNMP responsive devices when collectInterfaces, collectRoutes, or collectLayer2Data is enabled.

Passive crawlers are those that do not actively target any particular address space. Instead, passive crawlers listen to broadcast network protocols or communications to local routing peers using routing protocols. Passive crawlers continuously listen to network traffic and add newly discovered information to the database(s) 202, described in more detail below.

Passive crawlers participate in routing protocol conversations with peer routers to generate a target list of network paths that can then be scanned using active crawlers. The passive crawler announces itself as a non-routing router to other routers in the network of the organization. The passive crawler will then receive all link-state advertisements (LSAs) within the network. These LSA packets include the routes that are being advertised by other routers in the network.

Figure 3:
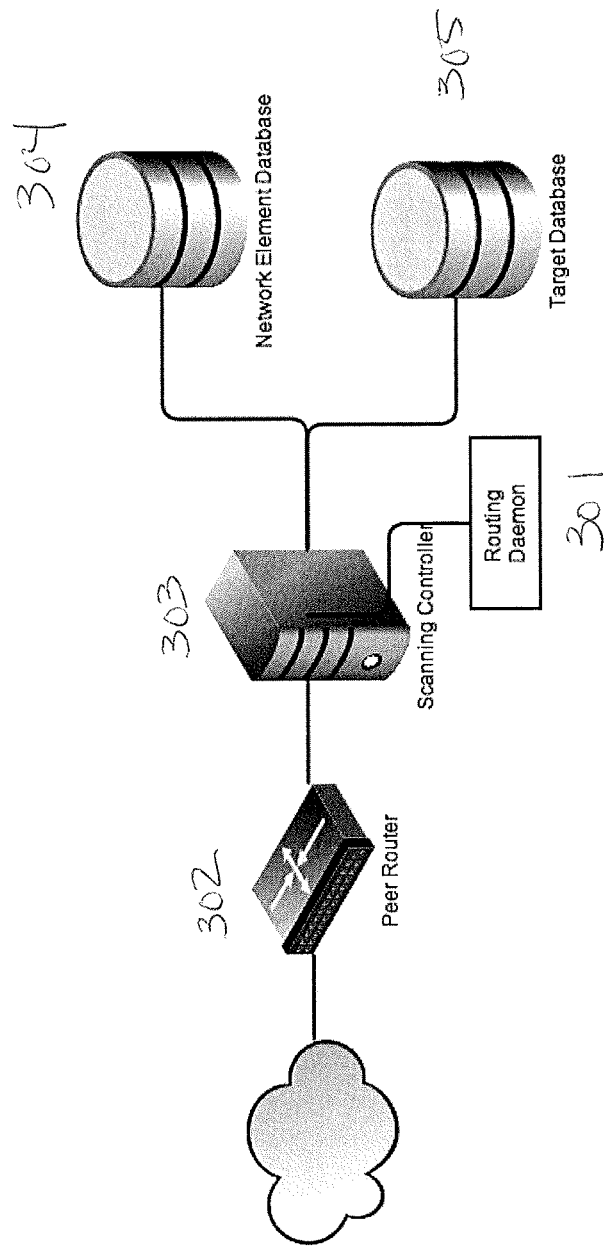
FIG. 3 is a diagram of exemplary hardware and software components that may be used to implement the crawling techniques of an embodiment of the present invention.

More particularly, with reference to FIG. 3, the passive crawler may comprise a routing daemon 301 (i.e., a computer program running as a background process) that is configured as a router (e.g., using protocols such as OSPF, BGP or other exemplary protocols as described above), but does not publish any routes of its own. Instead, the routing daemon connects to peer routers 302 and listens for route advertisements. When route advertisements are received by the routing daemon 301, they are delivered to the scanning controller 303. The scanning controller 303 adds any new routes to the network element database 304. The scanning controller 303 then compares the list of routes in the network element database 304 to the list of routes in the target database 305 and adds any new routes from the network element database 304 to the target database 305. The scanning controller 303 queries the target database 305 for routes that have not yet been scanned, or routes whose last scan time is less than the current time minus the re-scan interval, and flags them for processing by an active scanning process. In one embodiment, the re-scan interval may be set to, e.g., 10 minutes, or about 10 minutes, although other scan intervals may be used within the scope of the present invention. The shorter the rescan interval, the more interrogation packets will be sent to the network. Thus, the setting of the rescan interval should attempt to balance speed of rescan desired and the number of interrogation packets that will be sent to the network.

With reference to FIG. 4, an exemplary method of an embodiment of the present invention is illustrated and described. In step 401, a new route is discovered by a passive crawler (e.g., routing daemon 301). In step 402, the passive crawler delivers the route information to scanning controller 303. In step 403, it is determined whether the route exists in the network element database 304 (i.e., the network element database 304 being the repository for discovered network assets). If not, in step 404, it is determined to add the route to the network element database 304. In step 405, the route is saved in network element database 304. If the route does exist in the network element database 304 (or if it had not previously but was added in step 404), the process ends in step 407. In step 406, after the route is added to the network element database 304 in step 404, it is determined if the route exists in the target database. If so, then the data regarding the route is simply discarded. If not, it is determined to add the route to the target database in step 408 and, in step 409, the route is saved in the target database. In step 410, the scanning controller 303 checks the target database 409 for un-scanned targets. In step 411, it is determined whether any un-scanned targets exist. If not, the process ends in step 407. If so, the targets are delivered to the scanning daemon (e.g., an active crawler) for active discovery, in step 412.

In accordance with exemplary embodiments of the present invention, passive crawlers may be configured to listen for communications using the following exemplary routing protocols to gather data regarding routers (devices), router edges (links), and routes (i.e., a collection of links connecting one device to another). OSPF is a routing protocol for IP networks. OSPF is most often used on enterprise intranets for inter-router communications. Other supported intranet routing protocols may include IS-IS and Enhanced Interior Gateway Routing Protocol (EIGRP). BGP is a standardized exterior gateway protocol designed to exchange routing and reachability information between autonomous systems (AS) on the Internet. BGP is most often used on the public internet and service provider networks, but may also be used in certain intranet applications (e.g., multiprotocol label switching (MPLS) WAN connectivity). Broadcast (e.g., ICMPv6, ARP, DHCP) and other potential protocols may be used to find hosts on local broadcast domains. As will be understood by one of ordinary skill in the art, the afore-listed routing protocols are exemplary only. Passive crawlers may be configured to listen for communications using other routing protocols within the scope of the present invention.

Some particular functionalities of the present invention involve: discovering emerging internet protocol version 6 ("IPV6") devices; discovering newly attached network devices (including virtual and cloud); and determining if newly attached devices are changing layer-3 (switches, routers) network topology and related security anomalies. The ability to listen to ICMPv6 Neighbor Discovery Protocol allows the detection of new IPv6 devices as they enter the network (allowing these devices to be interrogated as they arrive, while they remain on the network). The ability to listen for OSPF Link State advertisements (or related, e.g., BGP, IS-IS control plane protocol updates) allows for analysis of newly injected routes and identification of new network forwarders/routers. This allows for these devices to be further interrogated and analyzed as they arrive on the network, whether these network functions are physical hardware or virtualized/cloud-based network function virtualization (NFV) elements. In such cases, because these changes are detected as requests for network participation are made, the systems and methods described herein are able to perform the required security anomaly analysis in a relevant timeframe.

Additional exemplary configuration options for active and passive configuration options are provided in the following listing. As will be understood by those skilled in the art, different configuration options may be available and employed within the scope of the present invention.

Configuration Options:
Target Address (CIDR) list—provides the list of IP addresses to be targeted
Broadcast
  broadcastDiscovery.enabled—turns broadcast listening on/off
  broadcastDiscovery.(arp|dhcp|icmpV6)—turns ARP, DHCP, and ICMPv6 listening on/off OSPF
- ospfDiscovery.enabled—turns OSPF listening on/off
- ospfDiscovery.area—designates which OSPF area will be listened to by the collector
- ospfDiscovery.auth—authentication type required (None, Simple, Cryptographic)
- ospfDiscovery.routerId—designates an IP address for the router process of the collector to utilize Host
- hostDiscovery.enabled—turns host targeting on/off
- hostDiscovery.targetInternalRoutes—target all IPs in route CIDRs if they are in the Eligible list
- hostDiscovery.icmp—enables use of ICMP protocol for host discovery
- hostDiscovery.tcpPorts—provides list of TCP ports to ping scan
- hostDiscovery.udpHighPort—enables the use of UDP protocol for host discovery, will use a "high port", which is a port not usually used for any standard application or network traffic.=

PathDiscovery
- pathDiscovery.enabled—turns network path targeting on/off
- pathDiscovery.expandV4Cidrs—provides rules for CIDR expansion
- pathDiscovery.maxStealths—indicates the maximum number of unanswered hops before a trace is timed out
- pathDiscovery.maxUnknownHops—indicates the maximum number of hops not contained within a target, internal, or known CIDR lists (e.g., the purpose of this crawler control element is to constrain the crawler within an area that is likely the customer network or an adjacent network but avoid spidering out into the Internet; the system will stop tracing to a target if the trace packets are traversing more than the number supplied here of systems (hops) which are "unknown")
- pathDiscovery.traceDiscoveredRoutes—indicates whether to trace to routes found in SNMP discovery
- pathDiscovery.traceToHosts—indicates whether to trace to individual hosts found via Host discovery
- pathDiscovery.icmp—enables use of ICMP protocol for path discovery
- pathDiscovery.tcpPorts—provides a list of tcp ports to use for path discovery
- pathDiscovery.udpPorts—enables use of UDP protocol for path discovery TCP port
- portDiscovery.enabled—enables standalone TCP port scanning; TCP port scanning can also be enabled by the profileDiscovery.collectEnhancedTCP, collectHTTP, or scanStandardTCPPorts configuration settings
- portDiscovery.tcpPorts—provides list of ports to scan Profile
- profileDiscovery.collectEnhancedTCP—OSDTCP enables scanStandardTCPPorts and requires portDiscovery (e.g., this causes the collector to send a set of TCP packets at target devices and analyze the responses attempting to profile the device, including determining its device type, vendor, model, OS, and OS Version
- profileDiscovery.collectHTTP—enables HTTP banner collection and TCP port discovery of HTTP and HTTPS Ports
- profileDiscovery.httpPorts—collects HTTP banners from these ports (all ports are added to TCP port scanning)
- profileDiscovery.httpsPorts—collect HTTP banners and certificate information from these ports (all ports are added to TCP port scanning)
- profileDiscovery.scanStandardTCPPorts—scans a list of well-known ports to be used in profiling and for OSDTCP SNMP
- snmpDiscovery.enabled—turns SNMP scanning on or off (if SNMP scanning is enabled, all credentials will be tested against all discovered devices)
- snmpDiscovery.collectInterfaces—indicates that the SNMP detail scanning should collect interface data
- snmpDiscovery.collectLayer2Data—indicates that that the SNMP detail scanning should collect layer 2 data
- snmpDiscovery.collectRoutes—indicates that that the SNMP detail scanning should collect routes
- snmpDiscovery.maxRouteTableSize—identifies the maximum number of routes to scan before skipping route collection on a device (e.g., to allow the collectors to avoid spending a large amount of time gathering routes from a router with a very large route table; in the majority of these situations, the router is an Internet facing router and most of the routes that would be gathered are not of interest nor under the management of the customer
- snmpDiscovery.skipBgpRoutes—indicates to skip route collection on BGP enabled routers The computers referenced herein are specially programmed to perform the functionality described herein. The non-transitory computer readable storage media that store the programs (i.e., software modules comprising computer readable instructions that are executed by computer processor) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the teims "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computerized method comprising:
   at a network router connected to a network of a plurality of routers for transferring data between computing devices:
   receiving, network route control plane data advertised by one or more other routers on the network, the network route control plane data comprising data describing one or more routes on the network, at a passive discovery module of the network router, the network router being configured to communicate with the one or more routers using one or more routing protocols but not to advertise route data;
   comparing, at the passive discovery module, the received network route control plane data to network element data stored in a network element database;
   determining, at the passive discovery module, whether the received network route control plane data meets network element criteria, wherein the received network element criteria includes a criterion that is met when the network route control plane data is a route advertisement transmitted by a router;
   in response to a determination that the received network route control plane data meets network element criteria:
      determining, at the passive discovery module, whether the received network route control plane data meets unscanned target criteria, wherein the unscanned target criteria includes a criterion that is met when the network route control plane data is transmitted by a router that has not been scanned by an active discovery module of the network router;
      in response to a determination that the received network route control plane data meets network element criteria and unscanned target criteria:
         delivering, by the passive discovery module, data describing the router that transmitted the received network route control plane data to an active discovery module of the network router, and
         transmitting an interrogation request, via the active discovery module of the network router, to the one or more routers described by the received network route control plane data that is indicative of an unscanned router,
   wherein the network route control plane data used for network element criteria and unscanned target determinations is one of: an OSPF new consolidated route message, a BGP new consolidated route message, an IS-IS new consolidated route message, an ARP new consolidated route message and a DHCP new consolidated route message.

2. The computerized method of claim 1, further comprising:
   receiving, from the active discovery module, in response to the interrogation request, data describing one or more of devices, paths, hosts, and ports associated with the network.

3. The computerized method of claim 1, wherein the passive discovery module is implemented as at least part of a collector module, the collector module further being configured to conduct active discovery.

4. The computerized method of claim 1, wherein the active discovery module is implemented as at least part of a collector module, the collector module further being configured to conduct passive discovery.

5. The computerized method of claim 2, further comprising:
   storing the data describing the devices, paths, hosts, and ports for forensics and cyber-security analytics.

6. A system comprising:
   a network router connected to a network of a plurality of routers for transferring data between computing devices, the network router including:
   one or more memory units each operable to store at least one program; and
   at least one processor communicatively coupled to the one or more memory units, in which the at least one program, when executed by the at least one processor, causes the at least one processor to perform the steps of:
   receiving, network route control plane data advertised by one or more other routers on the network, the network route control plane data comprising data describing one or more routes on the network, at a passive discovery module of the network router, the network router being configured to communicate with the one or more routers using one or more routing protocols but not to advertise route data;
   comparing, at the passive discovery module, the received network route control plane data to network element data stored in a network element database;
   determining, at the passive discovery module, whether the received network route control plane data meets network element criteria, wherein the received network element criteria includes a criterion that is met when the network route control plane data is a route advertisement transmitted by a router;
   in response to a determination that the received network route control plane data meets network element criteria:
      determining, at the passive discovery module, whether the received network route control plane data meets unscanned target criteria, wherein the unscanned target criteria includes a criterion that is met when the network route control plane data is transmitted by a router that has not been scanned by an active discovery module of the network router;
      in response to a determination that the received network route control plane data meets network element criteria and unscanned target criteria:
         delivering, by the passive discovery module, data describing the router that transmitted the received network route control plane data to an active discovery module of the network router, and
         transmitting an interrogation request, via the active discovery module of the network router, to the one or more routers described by the received network route control plane data that is indicative of an unscanned router,
   wherein the network route control plane data used for network element criteria and unscanned target determinations is one of: an OSPF new consolidated route message, a BGP new consolidated route message, an IS-IS new consolidated route message, an ARP new consolidated route message and a DHCP new consolidated route message.

7. The system of claim 6, the processor further performing the step of:

receiving, from the active discovery module, in response to the interrogation request, data describing one or more of devices, paths, hosts, and ports associated with the network.

8. The system of claim 6, wherein the passive discovery module is implemented as at least part of a collector module, the collector module further being configured to conduct active discovery.

9. The system of claim 6, wherein the active discovery module is implemented as at least part of a collector module, the collector module further being configured to conduct passive discovery.

10. The system of claim 7, the processor further performing the step of:

storing the data describing the devices, paths, hosts, and ports for forensics and cyber-security analytics.

\* \* \* \* \*